United States Patent [19]

Melnychyn

[11] Patent Number: 4,869,918
[45] Date of Patent: Sep. 26, 1989

[54] METHOD FOR EXTRACTING NUTRITIVE FACTORS FROM RAW VEGETABLE MATERIALS USING FLUID MILK BY-PRODUCTS

[76] Inventor: Paul Melnychyn, 53 Hillview Blvd., London, Ontario N6G 3A7, Canada

[21] Appl. No.: 229,965

[22] Filed: Aug. 9, 1988

[51] Int. Cl.$^4$ .................. A23L 1/025; A23L 1/20
[52] U.S. Cl. ..................... 426/598; 426/430
[58] Field of Search ............ 426/580, 583, 598, 801, 426/422, 425, 424, 430

[56] References Cited

U.S. PATENT DOCUMENTS

| | | | |
|---|---|---|---|
| 2,928,821 | 3/1960 | Chayen | 260/112 |
| 3,798,339 | 3/1974 | Peng | 426/801 |
| 4,075,361 | 2/1978 | Oberg | 426/655 |
| 4,105,803 | 8/1978 | Peng | 426/583 |
| 4,432,999 | 2/1984 | Bily | 426/583 |

FOREIGN PATENT DOCUMENTS 1130635  8/1982  Canada ..................... 99/61

Primary Examiner—Donald E. Czaja
Assistant Examiner—Helen Pratt
Attorney, Agent, or Firm—Ridout & Maybee

[57] ABSTRACT

Stable, edible protein-lipid food products are prepared by the comminution of raw vegetable material with fluid by-products of milk, such as cheese whey. Fluid by-products of milk have been found to be superior solvent systems for the extraction of stable protein-lipid complexes, in comparison with aqueous and alkaline extractants.

13 Claims, 1 Drawing Sheet

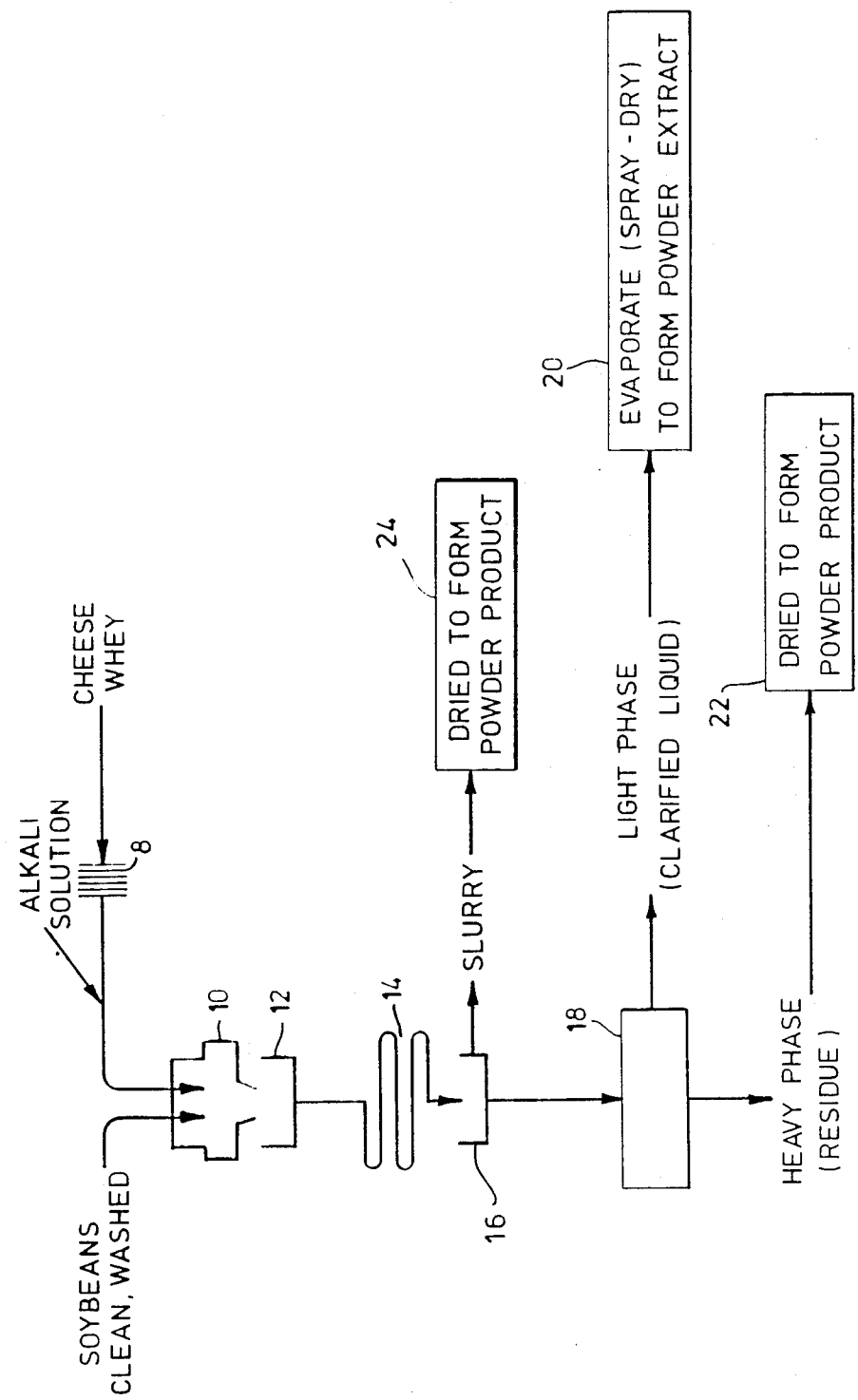

METHOD FOR EXTRACTING NUTRITIVE FACTORS FROM RAW VEGETABLE MATERIALS USING FLUID MILK BY-PRODUCTS

This invention relates to the extraction of stable, edible protein-lipid food products from raw vegetable materials, using fluid by-products of milk as the liquid extraction medium. The invention also relates to edible products resulting from the extractive treatment of whole soybeans with cheese whey.

A number of researchers in the field of agricultural chemistry have developed techniques for the aqueous extraction of edible factors from vegetable material. Chayen, in U.S. Pat. No. 2,928,821, describes a method for producing a protein-lipid complex from vegetable material, by comminuting raw vegetable material with water in a hammer mill and obtaining the protein-lipid complex as an acid precipitate from the extraction medium. A protein-lipid complex differs greatly in properties from a simple mixture of protein and lipid, in that the former is not greasy or water-repellent and is highly stable and resistant to deterioration by oxidation or bacterial action.

In later studies, Oberg described the preparation of a high-protein edible extract from oil seeds such as soybeans, using hot aqueous alkaline extractant media at a pH greater than 8. The resultant extract is neutralized with an acidic solution and spray dried. In Oberg's U.S. Pat. No. 4,075,361, it is emphasized that protein-lipid food products in which the level of complexed (bound) lipid is greater than 75% are characterized by high stability of the dried product in storage.

I have found that the aforesaid fluid milk by-products may advantageously be used as a solvent for the extraction of proteins from various types of raw vegetable materials to produce useful new products for the human food and/or animal feed industries. By "fluid by-products of milk" are designated herein buttermilk, skim milk, and acid or sweet cheese whey, whether single strength or in a concentrated state or combinations of these.

I have found that fluid by-products of milk, in particular cheese whey, are surprisingly superior solvent systems for the production of stable protein-lipid complexes, when compared with the above-mentioned aqueous media. The effect of milk-based extractants in markedly enhancing the complexing of lipids contributes to increased stability against development of oxidative and enzymatic rancidity of the products prepared according to my invention. Moreover, the introduction of lactose and milk proteins from the fluid milk by-product extracting medium into these products leads not only to enhanced nutritional value, but generally to a marked improvement in the flavor of products by reduction or elimination of the "green" flavor of raw vegetable food derivatives.

A further economic advantage which particularly characterizes the use of cheese whey to extract proteins and lipids from vegetable material according to my invention stems from the fact that cheese whey is substantially a "waste product" of the dairy industry. In the manufacture of cheese and cottage cheese, only the solids portion of "industrial" milk (about 6.5% of the total weight) is used. Significant effort has been expended to find economic uses for the liquid fraction, cheese whey. Proposed uses range from animal feed and fertilizer applications to concentrating, drying and "fractionating" the whey into carbohydrate (lactose) and protein (lactalbumin and betalactoglobulin) constituents. The method of my invention is directed towards using cheese whey in its entirety as a liquid extracting medium for other agricultural resources. The mixture of whey and vegetable material is processed according to the invention to produce "value-added" products and minimal or no waste requiring disposal.

My invention for attaining the above-described advantages is in one aspect a process for preparing a stable protein-lipid extract from solid, raw vegetable material which comprises the steps of:
 (a) continuously feeding said vegetable material and fluid by-products of milk, in a respective solid:liquid ratio from about 1:4 to about 1:10, through a high-impulse rendering device to produce a slurry;
 (b) separating said slurry into a liquid phase comprising a solution of stable protein/liquid extract and a solid phase residue; and
 (c) concentrating and drying said liquid phase to yield a stable protein-liquid extract.

In another aspect, my invention is a process for preparing a stabilized, full fat oil seed flour, comprising the steps of:
 (a) continuously feeding raw oil seeds and a fluid by-product of milk, in a respective solid liquid ratio of no greater than about 1:4 Kg/L, through a high-impulse rendering device to produce a slurry; and
 (b) drying the slurry to yield the stabilized flour.

These and other advantages, features and aspects of the present invention will be apparent from the following drawings, description and appended claims.

FIG. 1 is a flow diagram schematically illustrating the processing of vegetable material and fluid milk by-product extracting medium to produce proteinaceous ingredients according to the method of the invention.

As illustrated in FIG. 1, clean, washed raw vegatable materials and the fluid milk by-product extracting solvent pre-heated to the desired temperature in heat exchanger 8, are introduced simultaneously into a grinder 10. Slurry from the grinder is collected into a surge tank 12 where the pH and temperature are checked. The slurry is pumped from the surge tank into a holding tube 14 where it remains for a suitable time to permit completion of the extraction process, and thence is discharged into a second surge tank 16 where the pH and temperature are again checked.

The slurry pumped from surge tank 16 may itself be dried to a final product or may, as illustrated in the drawing figure, be pumped into a continuous solid bowl decanter centrifuge 18 to be separated into "light phase" (clarified liquid) and "heavy phase" (residue) which may be cooled and collected for later work-up.

To produce a powder product from the light phase extract, the material, if stored, is withdrawn from storage and is concentrated by means of a vacuum evaporator, then pumped into a spray dryer (connectively indicated as drying stage 20). It is preferable that a homogenizing pump be employed to transfer the concentrated fluid light phase from the vacuum evaporator to the spray dryer.

The heavy residue phase may be drum dried, or dried using a spray dryer which is equipped with a centrifugal atomizer (drying stage 22) rather than with a nozzle spray which tends to plug up. The dried light phase and heavy phase products may then be separately bagged, labelled and stored as manufactured products.

Optionally, the slurry from surge tank 16 may be dried in its entirety to a useful powdered product (drying stage 24), rather than separated into light and heavy phases. Such product is characterized by a higher lactose content than the dried heavy phase and a higher protein content than the extract. Where oilseeds are used as the raw vegetable material under extraction, the dried slurry product may be used in all applications requiring a stabilized, full fat oil seed flour.

As noted earlier, the fluid by-products of milk which may be used to extract nutritional factors according to the present invention include skim milk and cheese whey. Cheese whey is that fraction of milk from which protein constituents and/or butter fat have been removed in the process of manufacturing specific cheese products such as cottage cheese, cheddar cheese, mozzarella cheese, and so on. A number of the milk by-products which may be used to extract protein and fats from vegetable matter, such as skim milk, are themselves amenable to being dried and can be readily reconstituted into a liquid state by the addition of water. Such re-constituted fluid milk byproducts may also be used in the process of the invention.

Raw vegetable materials useful in the invention include cereal grains in various states of refinement such as whole seeds or "flours" from which the pericarp, bran or hull components have been entirely or partially removed, and the endosperm rendered into a fine state of dispersion by milling or a like operation. Cereal grains which may be used include wheat, oats, rye, barley, rice, corn and the like as well as "flours" produced from these materials.

In addition to the cereal grains, legumes such as lentils, dried beans, field peas, and oilseeds may be used, either separately or in conjunction with cereal grains as the raw vegetable matter to be extracted. "Oilseeds" refers to those crops containing a significant quantity of lipids and used commercially as a source of vegetable oils for use in human foods, animal feeds and industrial oils. The most common oil seed crops include soybeans, peanuts, sunflower, canola (rapeseed), sesame, safflower, cotton seed, and corn germ.

Oilseeds, particularly soybeans, are preferred as the vegetable material because of their substantial content of both lipid and protein constituents. In the past, flours prepared by grinding or crushing oilseeds have exhibited relatively short shelf life. The aforementioned Chayen and Oberg patents disclose enhanced stability of soybean flours in which complexation of the lipid constituents with protein to a level of about 75% exists. The effectiveness of the process of the present invention resides in the surprising superiority of fluid milk by-products, and in particular cheese whey, in bringing about this complexing of lipids, when compared with aqueous or alkaline aqueous solvent systems.

According to a preferred embodiment of the process of the invention, sweet cheese whey or a mixture of sweet and acid cheese whey is first heated to a temperature of between 85° C. and the boiling point, and the pH is adjusted to a level of between 7 and 8 by the addition of strong aqueous solution of sodium hydroxide. Both the heating of the whey and the adjustment of pH may be "in-line" operations, in which the cheese whey is heated in a heat exchanger and the pH of the heated whey is then adjusted by injection of the alkaline solution into the flowing stream of whey solvent leaving the heat exchanger on its way to the high impulse rendering device. Heating of the cheese whey may alternatively be a batch operating in which the whey is heated in bulk and pH-adjusted after or during the heating process.

Soybeans and the heated whey are simultaneously fed, in an appropriate pre-determined ratio of no greater than about 1:4 Kg./L into a high impulse rendering device such as a Fitzpatrick hammer mill or Reitz disintegrator. Greater proportions of solids to extractant than 1:4 generally give mixtures which are insufficiently fluid for the extraction process to be carried out effectively. The high impulse rendering device is fitted with a screen containing openings of approximately 0.04 inches in diameter. That size of openings in the screen appears to strike a practical balance between efficiency in the extraction of proteins within a very short time interval, and ease of later separation of protein-lipid extract from the insoluble residue.

The soybeans and whey solvent experience no significant residence time in the disintegrator beyond that sufficient to permit the resulting slurry to exit through the screen into a surge tank. The slurry in the surge tank is then pumped into a holding tube, where the residence time may be selected between near 0 to about 2.5 minutes, and is then collected into a holding receptacle from which it is pumped into a centrifugal separator. A continuous solid bowl centrifugal separator is preferred for treatment of the slurry, but a desludger or other separating device may be used.

The products of this process are a clarified emulsified extract (light phase) and an insoluble residue (heavy phase). The heavy phase may be dried directly, or may first be washed one or more times with fresh cheese whey and re-centrifuged to produce some further light phase product.

The light phase and washings, if any, are concentrated under vacuum and then pumped, preferably by means of a homogenizing pump, into a conventional spray drier where the product is dried under conditions which do not cause scorching during the drying operation.

The dried extract has general food and feed applications by reason of its fat, protein and lactose content. It exhibits a markedly improved flavor over the green, beany flavor of previous soybean flours and, in addition, contains high-quality milk proteins which have been introduced from the whey extractant. The extract is of particular use, however, as an agent for the stabilization of oil/water combinations in soups, salad dressings, pharmaceutical preparations, cosmetics, etc. The extract is also suitable as a carrier for fat-soluble organic compounds such as insecticides and herbicides.

The heavy phase (residue) still retains a substantial protein content of 25% or more and may be used as nutritional additive in flours for baking and in animal feed.

Features of the invention are demonstrated by the following examples.

EXAMPLE I

Whole soybeans and the extraction solution were fed continuously into a Fitzpatrick hammer mill at respective feed rates of 0.74 kg/min and 7.4 L/min. The extractant solution was pre-heated, neutralized cheese whey, derived 70% from cheddar (sweet whey) and 30% from cottage cheese (acid whey) manufacture. The liquid whey, held in storage under refrigeration at about 3° C., was heated to 80° C. immediately prior to use by passage through a heat exchanger. The stream of heated whey was neutralized by addition of aqueous sodium hydroxide solution (20 g/L) at a rate of 6 L/hr.

The mill was operated with a 0.040 inch screen, and the pH of the slurry was checked frequently to assure that it remained around 7. The slurry was held for 2.5 minutes at 75° C. in a holding tube, whence it was pumped to a continuously operated solid bowl centrifugal separator at a rate of 24 Kg/min. Operation of the separator at 5,000 rpm effected separation of soluble and insoluble phases.

The light phase (containing soluble constituents) was concentrated under vacuum in an APV Evaporator at a rate of slightly more than 20 gal./hr. to bring about a reduction of liquid volume from 45 gallons to 17 gallons.

The concentrated light phase was then dried in a Proctor Schwartz spray drier at a feed rate of 16 gallons per hour, with an air inlet temperature of 500° F., and an air outlet temperature of 185° F.

The dried extract (light phase) was found to consist of 34% protein and 13.3% lipid. The greatest part of the balance consisted of lactose from the cheese whey solvent. Significantly, it was found that 93% of the lipid content of the extract was not extractable with petroleum ether, i.e., about 93% of the lipid content of the product were complexed with protein.

The dried residue (heavy phase) was found to have a protein content of 28.2%.

EXAMPLE 2

Operational conditions were similar to those of Example 1, except that higher feed rates (soybeans 1.7 kg/min and cheese whey 18.7 L/min) and a higher extractant temperature of 85° C. were employed. The ratio of soybeans to cheese whey solvent remained at about 1:10 as in Example 1.

Based on the total soluble solids in the clarified extract, the yield of protein based on the starting beans was 71%. The protein contents of the dried extract and of the dry heavy phase were determined to be 30% and 27%, respectively.

The protein contributed to the products by the whey extractant enter predominantly into one or other of the light phase and the heavy phase, depending upon the processing temperature selected. It was noted that at temperatures of 90° C. or greater, cheese whey formed a precipitate, and the fraction of protein in the heavy phase was found to increase at the expense of the light phase. Accordingly, although whey may be used as an extracting medium at a higher temperature, the milk proteins may be incorporated in the residue or heavy phase rather than the dried extract under these conditions.

EXAMPLE 3

A feed rate of 1.76 kg/min for soybeans and 10.8 L/min for cheese whey (i.e., a 1:6 ratio) and a temperature of 95° C. for the heated cheese whey were used, with other operational conditions being similar to those of Example 1. The protein portion of soluble constituents in the dried extract was found to be 30% and the lipid content, 14.2%. Petroleum ether extraction showed that only 61% of the lipid was complexed under these conditions.

EXAMPLE 4

Tables I and II show comparative data obtained on dried slurries of whole soybeans. The left column of each table relates to processing with aqueous alkali solvent, where a slurry was produced at pH 8.5 and neutralized to pH 7 prior to drying. The right column gives the comparison values of processing with cheese whey (sweet whey from cheddar 70% plus acid whey from cottage cheese 30%) which was neutralized with sufficient alkali to produce a soybean slurry at pH 7. Thus, solublized proteins in slurry produced with cheese whey are extracted under neutral, rather than alkaline conditions.

Table I sets out data obtained for a 1:6 soybean:extractant feed ratio, and Table II compares the alkali extraction with cheese whey extraction for a soybean:solvent feed ratio of 1:10.

TABLE I

|  | Alkaline | Whey |
|---|---|---|
| Soluble solids in slurry, % | 62 | 72 |
| Soluble protein in slurry, % of total in soybeans | 75 | 65 |
| Protein in soluble solids, % | 46 | 30 |
| *Protein (dry basis), % | 41 | 31 |
| *Lipid (dry basis), % | | |
| Total (acid hydrolyzed) | 17.2 | 14.2 |
| Extractable with petroleum ether | 15.8 | 5.5 |
| Lipid Complexed, % of total | 8 | 61 |

TABLE 2

| Soluble solids in slurry, % | 66 | 74 |
|---|---|---|
| Soluble protein in slurry, % of total | 68 | 65 |
| Protein in soluble solids, % | 47 | 27 |
| *Protein (dry basis), % | 40 | 29 |
| *Lipid (dry basis), % | | |
| Total (acid hydrolyzed) | 19.6 | 13.5 |
| Extractable with petroleum ether | 12.2 | 2.1 |
| Lipid Complexed, % of total | 38 | 84 |

*Differences among numerical values are attributed to the contribution of solids from cheese whey, which correspond to about one-third of the total Under both feed ratio conditions, but particularly for an extraction ratio of 1:10 soybeans/solvent, cheese whey is seen to be a much superior solvent system for the complexing of oil seed lipids, compared to aqueous alkali solution. Accordingly, oil seed "flours" with high fat content, prepared in accordance with the method of the invention, exhibit enhanced shelf-life and diminished problems of storage.

Although the present invention has been described with reference to a preferred embodiment, other versions of the process may be used. In particular, if a very high lipid content oil seed such as rapeseed is used, the addition of another agricultural resource material, preferably one that has a reasonable protein content and is relatively low in oil such as leguminous materials, can provide the necessary protein above that indigenous to the seed, to complex the free oil. Selective combinations of low and high-lipid materials may be extracted in order to produce products having a broad spectrum of protein, fat and carbohydrate composition.

I claim:

1. A process for preparing a protein-lipid complex with enhanced oxidative stability and resistance to enzymatic rancidity from solid, raw vegetable material, comprising the steps of:
    (a) continuously feeding said vegetable material and a fluid by-product of milk, in a respective solid:liquid ratio of no greater than about 1:4 Kg/L through a high-impulse rendering device to produce a slurry;

(b) separating said slurry into a liquid phase comprising a solution of stable protein-liquid complex and a solid phase residue; and (c) concentrating and drying said liquid phase to yield a stable protein-lipid complex.

2. A process as claimed in claim 1, wherein said fluid milk by-product is first heated to a temperature of between about 80° C. and the boiling point, and the pH thereof is selectively adjusted by addition of alkali, so that said slurry is approximately neutral.

3. A process as claimed in claim 1, wherein said slurry is maintained at a temperature of at least about 75° C. for at least about 2 minutes immediately prior to separation of the liquid phase from the solid phase.

4. A process as claimed in claim 2, wherein said raw vegetable material comprises oilseeds.

5. A process as claimed in claim 4, wherein said oilseeds comprise soybeans.

6. A process as claimed in claim 1, wherein said fluid by-product of milk is cheese whey.

7. A process as claimed in claim 5, wherein said fluid by-product of milk is cheese whey.

8. A process as claimed in claim 1, wherein said high impulse rendering device is a hammer mill provided with an output screen operable to pass slurry having a particle size of less than about 0.040 inches.

9. A process as claimed in claim 1, wherein said step of separating the liquid and solid phases of said slurry is carried out in a solid bowl continuous centrifugal separator.

10. A process as claimed in claim 2, comprising the further step of drying said solid phase residue to produce a powder for use as a food additive.

11. A process for preparing a full fat oilseed flour with enhanced stability against the development of oxidative and enzymatic rancidity, comprising the steps of:

(a) continuously feeding raw oilseeds and a fluid by-product of milk, in a respective solid:liquid ratio of no greater than about 1.4 Kg/L, through a high-impulse rendering device to produce a slurry comprising solid phase materials dispersed in a solution of a stable protein-lipid complex; and (b) drying said slurry to yield the stabilized flour.

12. A process as claimed in claim 11, wherein said oilseeds comprise soybeans.

13. A process as claimed in claim 12, wherein said fluid by-product of milk comprises cheese whey.

* * * * *